(12) United States Patent
Cook

(10) Patent No.: US 12,520,920 B1
(45) Date of Patent: Jan. 13, 2026

(54) METHODS AND SYSTEMS FOR CONVENIENT EYEGLASS HOLDERS

(71) Applicant: Jacquelyne K. Cook, Greeley, CO (US)

(72) Inventor: Jacquelyne K. Cook, Greeley, CO (US)

( * ) Notice: Subject to any disclaimer, the term of this patent is extended or adjusted under 35 U.S.C. 154(b) by 0 days.

(21) Appl. No.: 18/882,603

(22) Filed: Sep. 11, 2024

Related U.S. Application Data

(60) Provisional application No. 63/581,769, filed on Sep. 11, 2023.

(51) Int. Cl.
A45C 11/04 (2006.01)

(52) U.S. Cl.
CPC ................................. A45C 11/04 (2013.01)

(58) Field of Classification Search
CPC ..................................................... A45C 11/04
USPC ....................................................... 206/5, 6
See application file for complete search history.

(56) References Cited

U.S. PATENT DOCUMENTS

| | | | | |
|---|---|---|---|---|
| 4,707,088 A | * | 11/1987 | Tabacchi | G02C 3/04 D16/302 |
| 5,501,321 A | * | 3/1996 | Liu | A45C 11/04 206/5 |
| 5,983,459 A | | 11/1999 | Goldenberg | |
| 6,210,003 B1 | | 4/2001 | Chan | |
| 6,382,482 B1 | * | 5/2002 | Chao | B60R 7/05 224/183 |
| 6,564,432 B1 | | 5/2003 | Kushner | |
| D908,465 S | | 1/2021 | Chen | |
| 2002/0157968 A1 | * | 10/2002 | Chen | B43K 29/00 206/5 |
| 2009/0057165 A1 | * | 3/2009 | Park | A45C 11/04 206/5 |
| 2023/0192386 A1 | * | 6/2023 | Stocco | A45C 11/04 206/5 |

OTHER PUBLICATIONS

Amazon.com, Yuoyar 2 Packs Sunglasses Holders for Car Visor—Magnetic Leather Sunglasses Holder and Ticket Card Clip—Car Visor Accessories, Aug. 24, 2022, 9 pages.

* cited by examiner

*Primary Examiner* — Jacob K Ackun
(74) *Attorney, Agent, or Firm* — Santangelo Law Offices, P.C.

(57) ABSTRACT

Embodiments of the application may include eyeglasses containers systems and methods having an eyeglass holder compartment with two movable flaps located side by side within a frame where an outermost edge of the moveable flaps may be attached to a frame with a hinge mechanism. At least part of an innermost edge of each of the moveable flaps may meet together in a closed position and each of the moveable flaps may be configured to swing inward and outward. A filling may be located inside a frame which may secure at a pair of eyeglasses.

20 Claims, 11 Drawing Sheets

METHODS AND SYSTEMS FOR CONVENIENT EYEGLASS HOLDERS

This application is a U.S. Nonprovisional Application claiming priority to and the benefit of U.S. Provisional Application No. 63/581,769 filed Sep. 11, 2023, hereby incorporated by reference herein in its entirety.

BACKGROUND OF THE INVENTION

Keeping track of eyeglasses, whether they're readers, sunglasses, or even prescription lenses, can feel like a constant challenge, especially when you rely on them throughout the day. One minute, they're on your head, the next they're on a countertop, in the car, or misplaced in a jacket pocket. The more you use them, the more elusive they seem to become.

For someone who needs to swap between glasses frequently-whether to read a menu, shield their eyes from the sun, or focus on detailed tasks—it's easy to misplace them or leave them behind. Some people may place glasses on their head when not in use which can stretch them out or lead them to falling and getting damaged. You pick them up and put them down countless times a day, and suddenly they're nowhere to be found just when you need them most. Keeping multiple pairs of glasses in different spots (one at home, one in the car, one at work) can only go so far when it comes to ensuring you always have them at hand. Plus, carrying cases can be bulky and inconvenient to use every time you need quick access and constantly looking in a purse or backpack for a pair of glasses just to read texts or other fine print can be frustrating. There is a need for a simple, easy-to-use holder that can attach to a pocket, clothing, necklace, purse, or the like. Having a dedicated spot to store your eyeglasses—where you know they'll always be within reach-takes away the stress of constantly hunting them down.

SUMMARY OF THE INVENTION

The present application includes a variety of aspects, which may be selected in different combinations based upon the particular application or needs to be addressed. In various embodiments, the application may include an easy to use eyeglass holder which can be clipped to another object.

It is an object of the application to provide an eyeglass holder that can securely hold a pair of eyeglasses.

It is another object of the application to provide an eyeglass holder that may be small, unobtrusive, and even easy to operate.

Naturally, further objects, goals and embodiments of the application are disclosed throughout other areas of the specification, claims, and drawings.

DETAILED DESCRIPTION OF THE INVENTIONS

Figure 1:
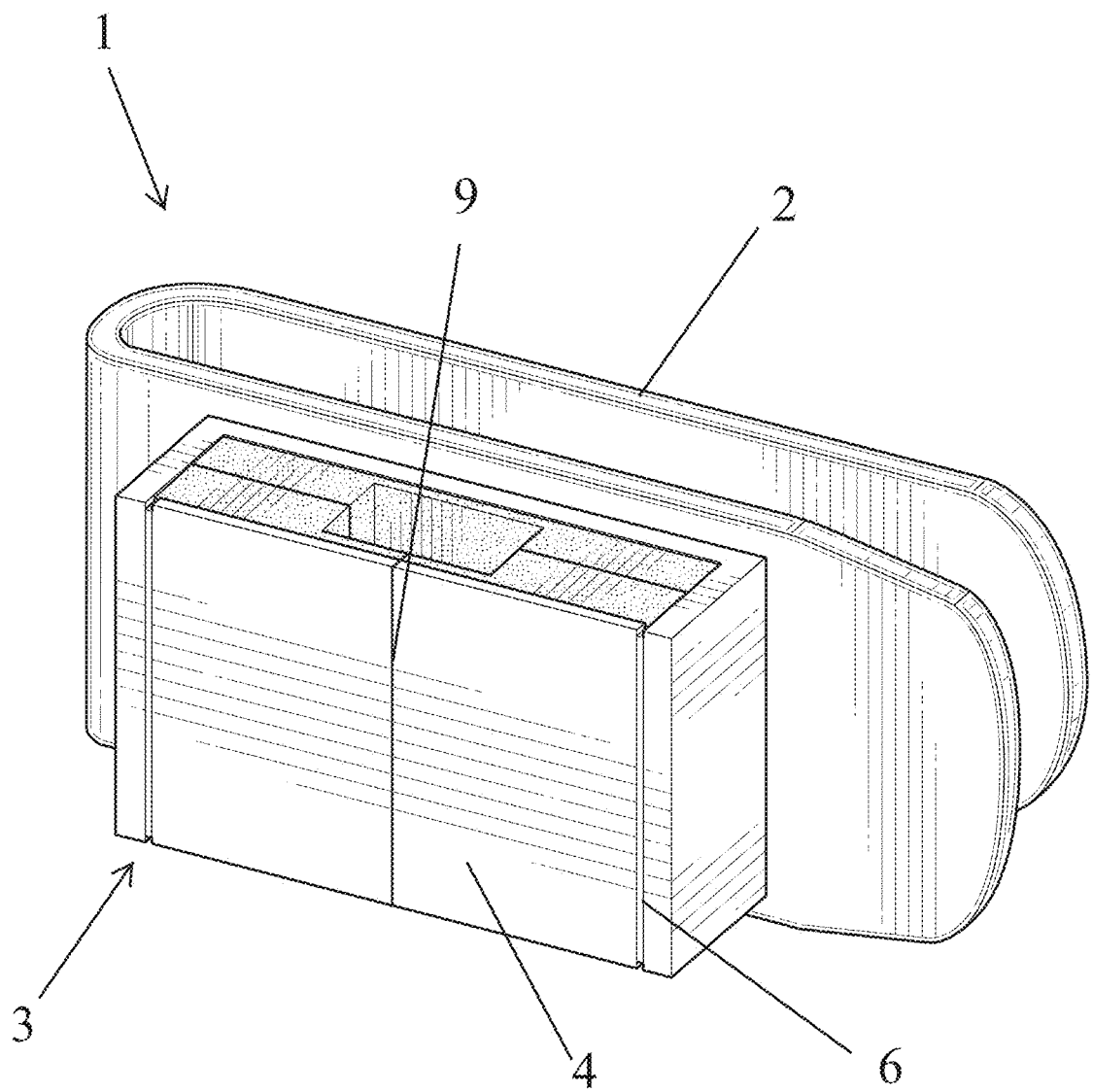
FIG. 1 shows a non-limiting example of an eyeglasses container according to some embodiments.

It should be understood that embodiments include a variety of aspects, which may be combined in different ways. The following descriptions are provided to list elements and describe some of the embodiments of the application. These elements are listed with initial embodiments; however, it should be understood that they may be combined in any manner and in any number to create additional embodiments. The variously described examples and preferred embodiments should not be construed to limit the embodiments of the application to only the explicitly described systems, techniques, and applications. The specific embodiment or embodiments shown are examples only. The specification should be understood and is intended as supporting broad claims as well as each embodiment, and even claims where other embodiments may be excluded. Importantly, disclosure of merely exemplary embodiments is not meant to limit the breadth of other more encompassing claims that may be made where such may be only one of several methods or embodiments which could be employed in a broader claim or the like. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

Embodiments of the application seek to provide users of multiple demographics with a small, attractive clip for storing and securing a pair of eyeglasses. It may be lightweight and even sleek. It may include a double-ended clip feature so users can easily attach and detach the glasses, perhaps without the need to open a clasp while enabling users to install a clip onto apparel, purses, backpacks, or the like while consistently keeping their glasses in an easily accessible location. As discussed herein, some embodiments may include a pivoting spring clip that can accommodate the glasses for carrying at a desired angle. Designs may be in any color, style, embellishments, customization including but not limited to a masculine look with leather-type materials, multi-colors, rhinestones, and the like.

Embodiments of the present application may include an eyeglasses container which may have a fastener clip and even an eyeglass holder compartment. An eyeglass holder compartment may have a two movable flaps perhaps located side by side within a frame; an outermost edge of each moveable flaps which may be attached to the frame perhaps with a hinge mechanism; at least part of an innermost edge of each moveable flap may substantially meet together when in a closed position; wherein each moveable flaps may be configured to swing inward and outward perhaps along a hinge mechanism; and perhaps even a filling inside a frame which may be configured to secure at least part of a pair of eyeglasses; wherein in some embodiments, an eyeglass holder can be attached to a fastener clip; and the like.

Methods may include utilizing an eyeglasses container comprising steps of providing an eyeglass holder compartment; pushing at least part of a pair of eyeglasses through two moveable flaps attached to a frame of said eyeglass holder compartment while said moveable flaps swing inward by a hinge mechanism between an outermost edge of each of said moveable flaps that are attached to said frame; pushing said at least part of said pair of eyeglasses into a filling inside said frame; securing said pair of eyeglasses into said filling; allowing said moveable flaps to move into a closed position where an innermost edge of each of said moveable flaps substantially meet together; and perhaps even pulling said pair of eyeglasses from said filling and through said moveable flaps while said moveable flaps swing outward by said hinge mechanism.

As may be understood in FIG. 1, an eyeglasses container (1) may include a fastener clip (2) and perhaps an eyeglass holder (3). In some embodiments, an eyeglass holder (3) may not have a fastener clip attached to it. A fastener clip (2) may be any type of clip which can be used to attach to an object such as but not limited to a sun visor, clothing, handbag, backpack, belt, pants, skirts, leggings, pockets, cell phone, cell phone case, computer, jewelry, necklace, or the like. A fastener clip may be any kind of clip that can be attached to an object such as by applying pressure, mechanical tension, force, to hold things in a position, or the like. A fastener clip may be a slide, clip, clasp, grip, clamp, C-clamp, spring clamp, safety clip, or the like.

Figure 8:
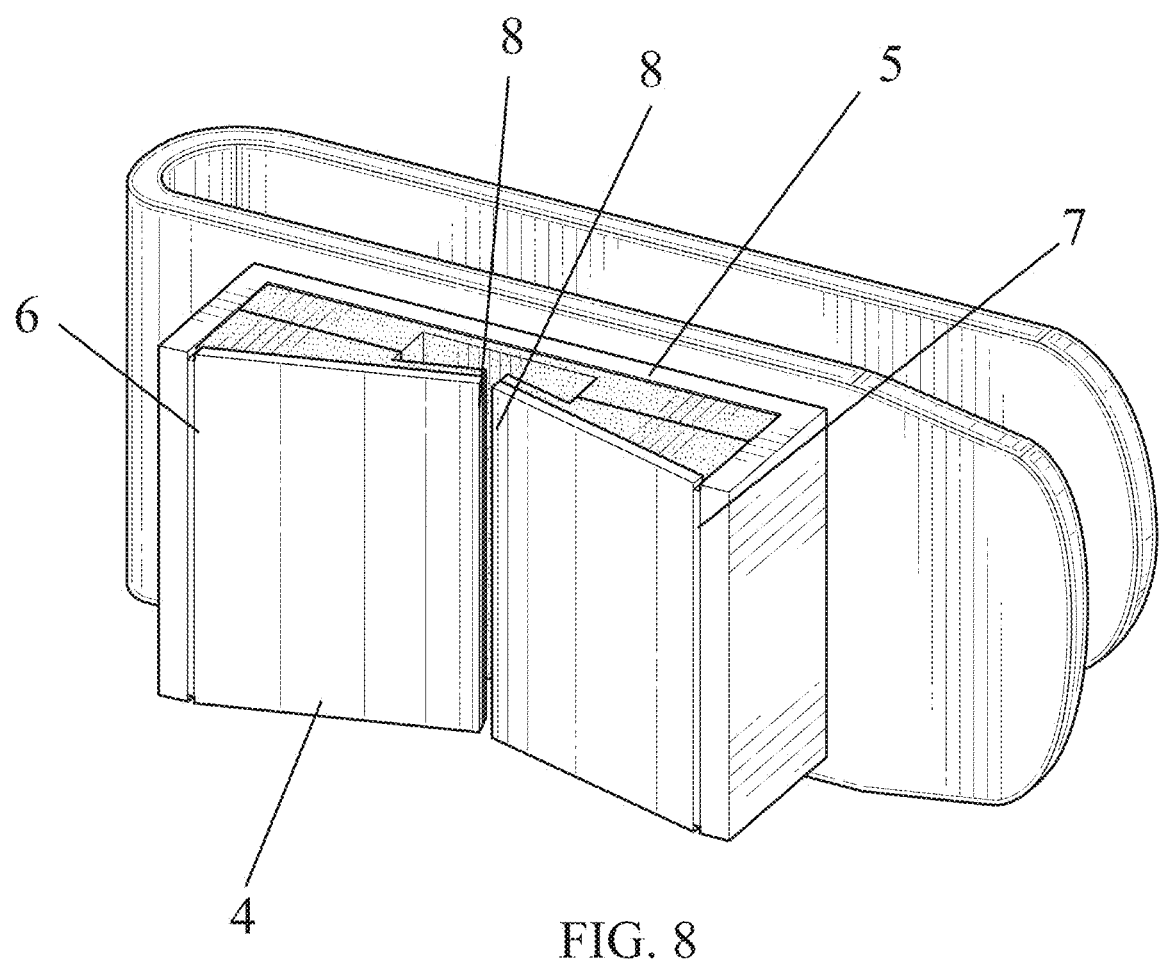
FIG. 8 shows a non-limiting example of an eyeglasses container with an open eyeglass holder according to some embodiments.
Figure 16:
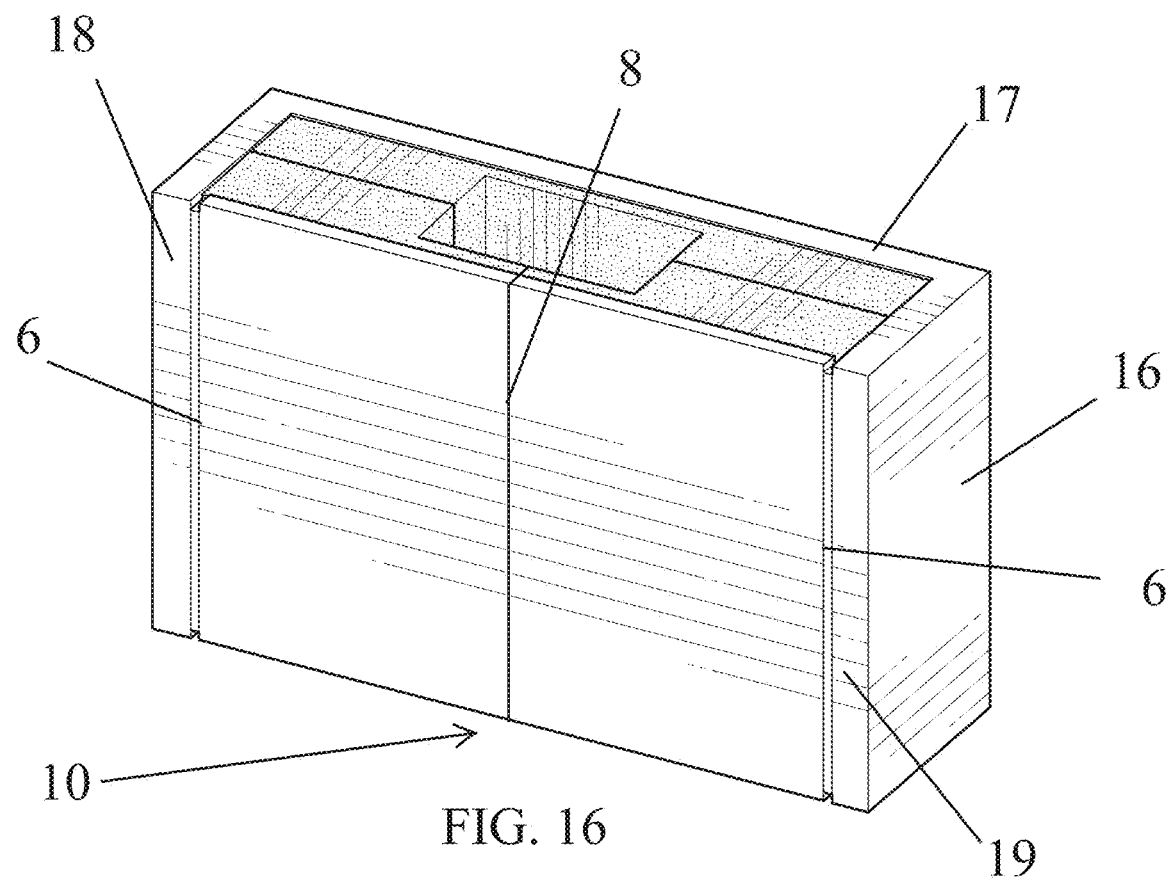
FIG. 16 shows a non-limiting example of an eyeglass holder in a closed position according to some embodiments.
Figure 17:
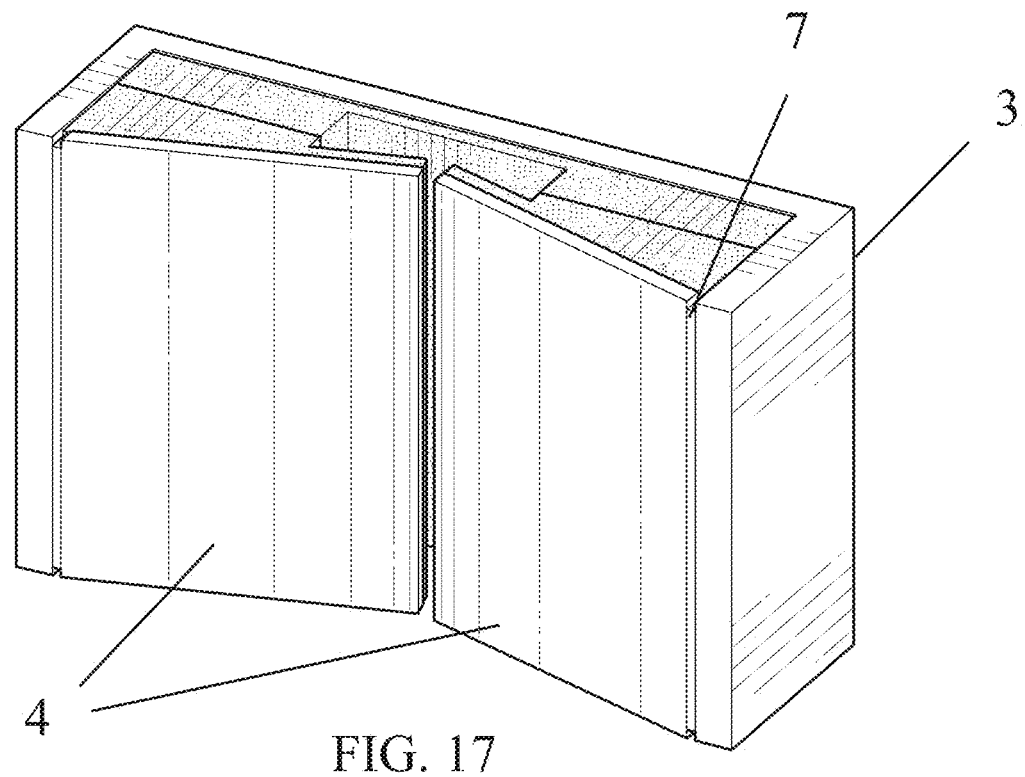
FIG. 17 shows a non-limiting example of an eyeglass holder in an open position according to some embodiments.

As shown in FIGS. 8, 16 and 17, an eyeglass holder may have a moveable flap (4), perhaps two moveable flaps which may be located side by side perhaps within a frame (5). An outermost edge (6) of a moveable flap may be attached to a frame perhaps with a hinge mechanism (7). A moveable flap may be any size or shape including but not limited to rectangular, square, circular, triangular, any combination thereof, or the like. A hinge mechanism (7) may allow a flap to move inward and even outward along the outermost edge of the flap. A hinge mechanism (7) may allow a flap to pivot relative to a frame which could be accomplished with a hinge, plates and a pin, living hinge, clamshell hinge, flat hinge, double hinge, molding in a material, or any other way that allows one part to pivot relative to the other. The innermost edges (8) of each moveable flap may be located near each other, may substantially meet together (9), may meet together, or may perhaps touch each other, perhaps when in a closed position (10). In embodiments, the moveable flaps may be substantially flush with each other perhaps when in a closed position and perhaps when no force may be applied. In alternative embodiments, moveable flaps may be positioned to overlap at their innermost edges.

Figure 2:
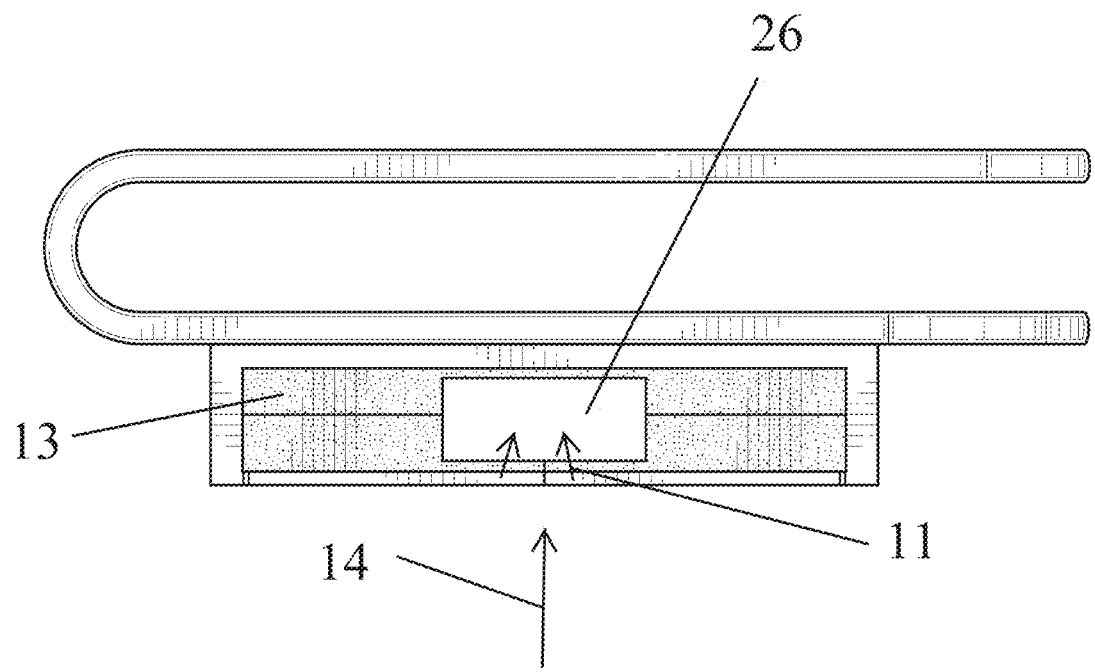
FIG. 2 shows a non-limiting example of a top view of an eyeglasses container as shown in FIG. 1 according to some embodiments.
Figure 3:
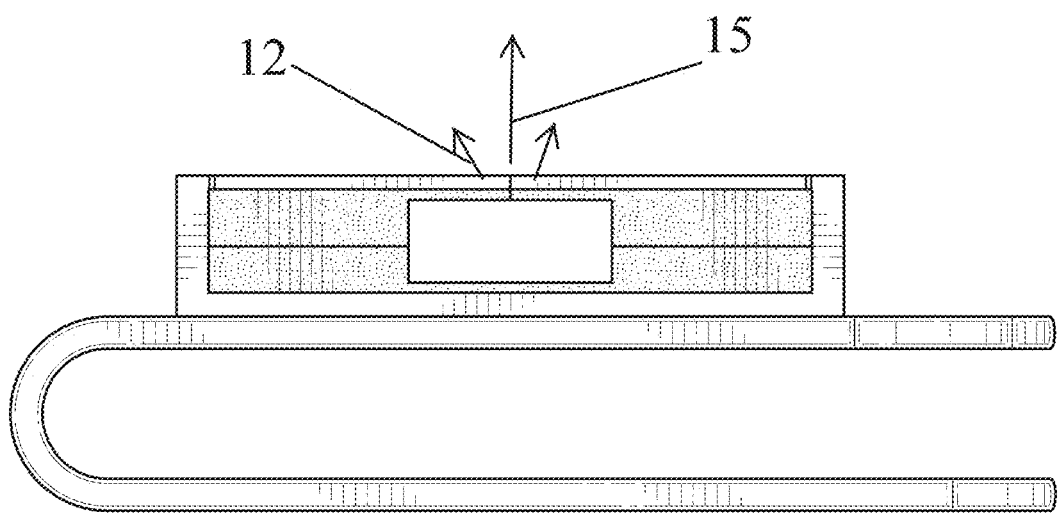
FIG. 3 shows a non-limiting example of a bottom view of an eyeglasses container as shown in FIG. 1 according to some embodiments.
Figure 4:
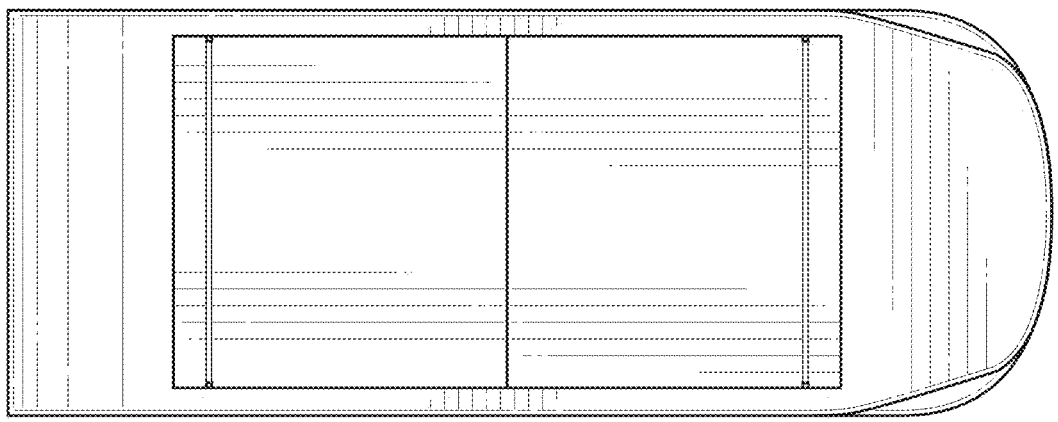
FIG. 4 shows a non-limiting example of a front view of an eyeglasses container as shown in FIG. 1 according to some embodiments.
Figure 5:
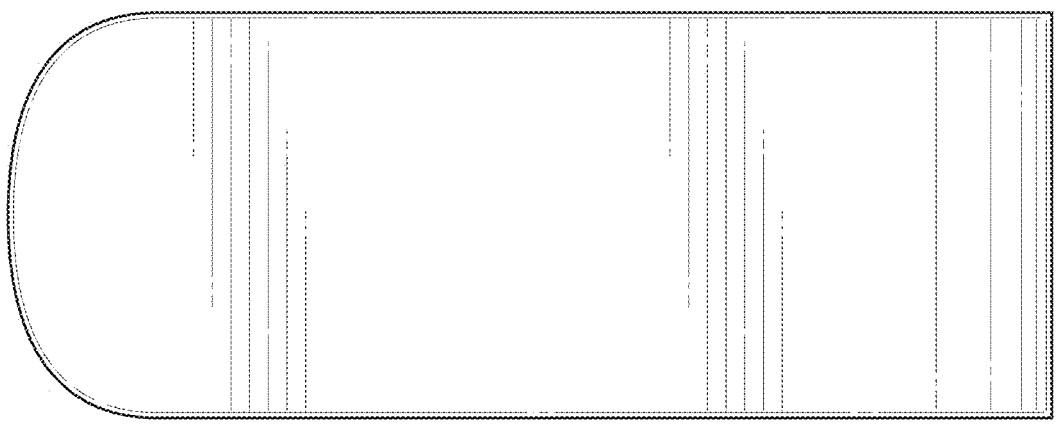
FIG. 5 shows a non-limiting example of a back view of an eyeglasses container as shown in FIG. 1 according to some embodiments.
Figure 6:
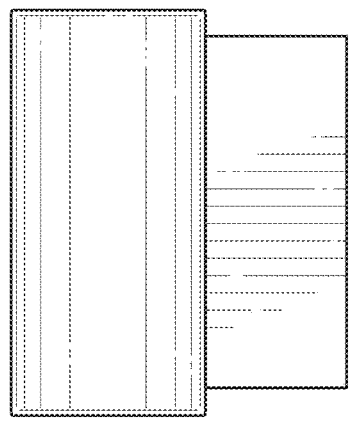
FIG. 6 shows a non-limiting example of a side view of an eyeglasses container as shown in FIG. 1 according to some embodiments.
Figure 7:
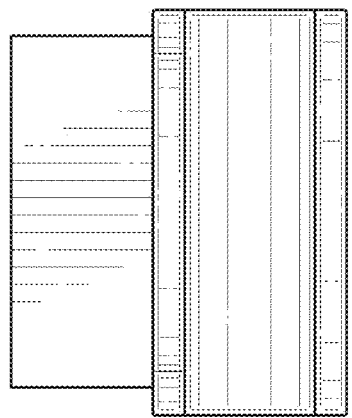
FIG. 7 shows a non-limiting example of an opposite side view of an eyeglasses container as shown in FIG. 1 according to some embodiments.
Figure 9:
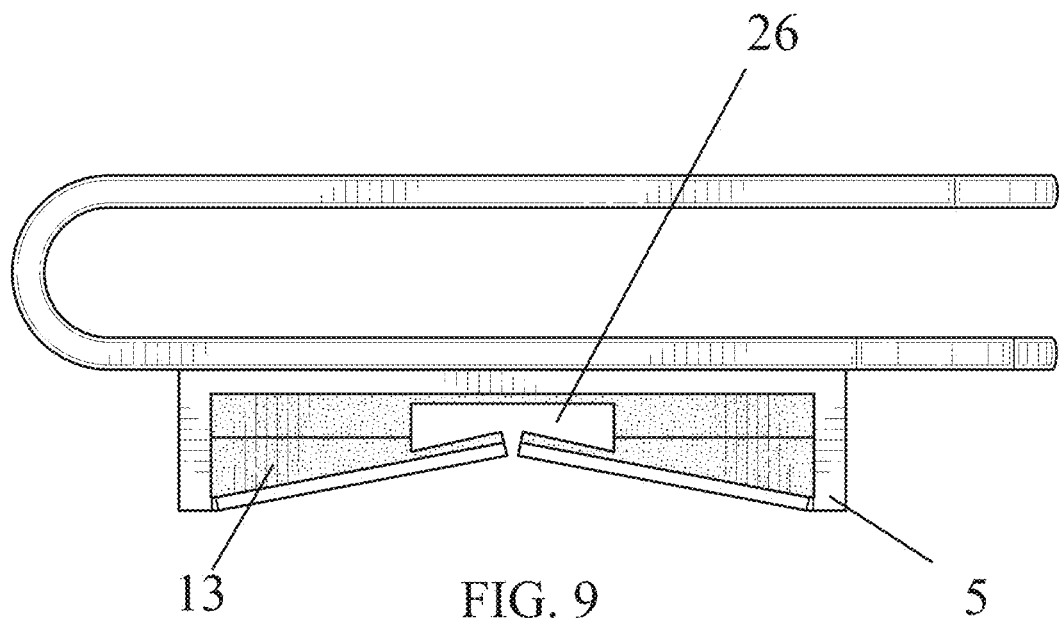
FIG. 9 shows a non-limiting example of a top view of an eyeglasses container as shown in FIG. 8 according to some embodiments.
Figure 10:
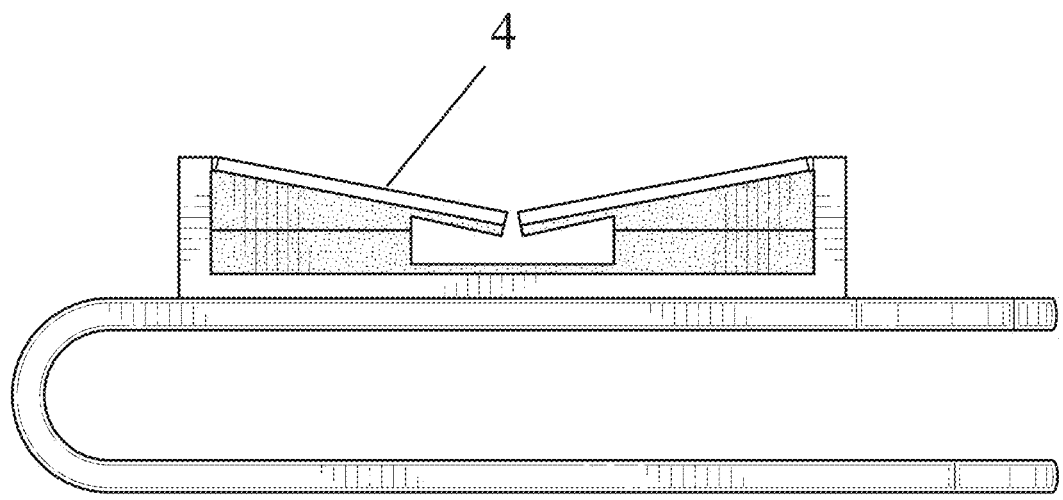
FIG. 10 shows a non-limiting example of a bottom view of an eyeglasses container as shown in FIG. 8 according to some embodiments.
Figure 11:
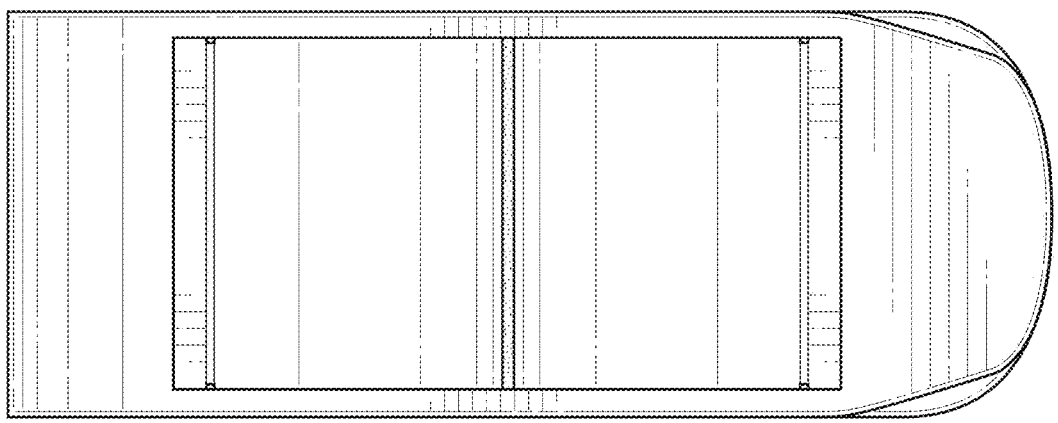
FIG. 11 shows a non-limiting example of a front view of an eyeglasses container as shown in FIG. 8 according to some embodiments.
Figure 12:
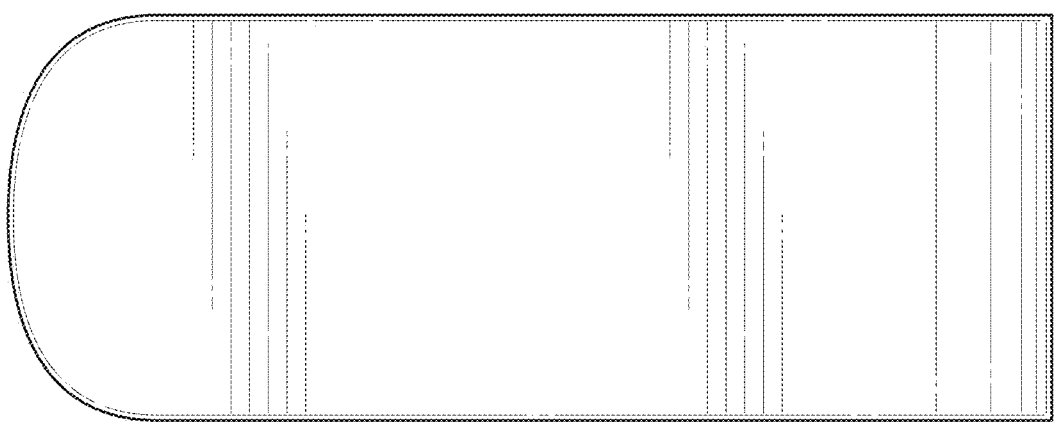
FIG. 12 shows a non-limiting example of a back view of an eyeglasses container as shown in FIG. 8 according to some embodiments.
Figure 13:
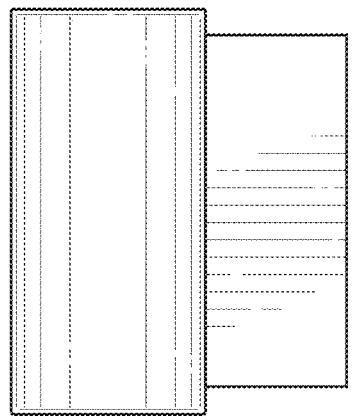
FIG. 13 shows a non-limiting example of a side view of an eyeglasses container as shown in FIG. 8 according to some embodiments.
Figure 14:
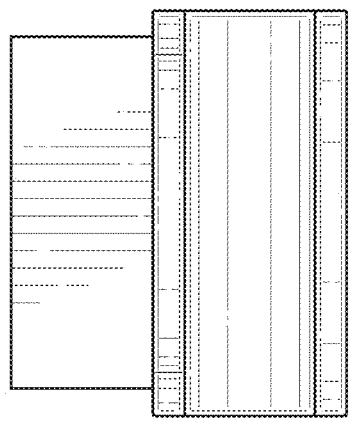
FIG. 14 shows a non-limiting example of an opposite side view of an eyeglasses container as shown in FIG. 8 according to some embodiments.

As may be understood in FIGS. 2 and 3, each moveable flap may swing inward (11) and even outward (12) when a force may be applied inward (14) perhaps by pushing eyeglasses into the holder and when a force may be applied outward (15) perhaps by pulling eyeglasses out of a holder, respectively. A eyeglasses container (1) may include a filling (13) inside a frame (5) which may be configured to secure at least part of a pair of eyeglasses as shown in FIGS. 9 and 13. A filling (13) may be any type of spongy, squishy, pliable material such as but not limited to silicon, soft silicone material with high elasticity, sponge, polyurethane foam, cellulose, polymers, foam rubber, cellulose sponge, melamine foam, foam sponge, loofah, hydrophilic foam, microfiber sponge, synthetic fibers, absorbent material, or the like. A filling may be able to cushion, grasp, confirm with, or the like with the part of the eyeglasses that may be pushed into it.

In some embodiments, a filling may have an opening (26) such as shown in FIGS. 2 and 9. Moveable flaps may be pushed into an opening (26) as they swing inward and the opening may allow the moveable flaps some unrestricted movement to be swung inward.

A frame (16) may be any kind of shape such as but not limited to rectangle (16), circle, square, or the like. A frame may have a back side (17), a first side (18), and perhaps even a second side (19) as shown in FIG. 17. An outermost edge (6) of each moveable flap may be attached to the first side and the second side respectively.

Figure 15:
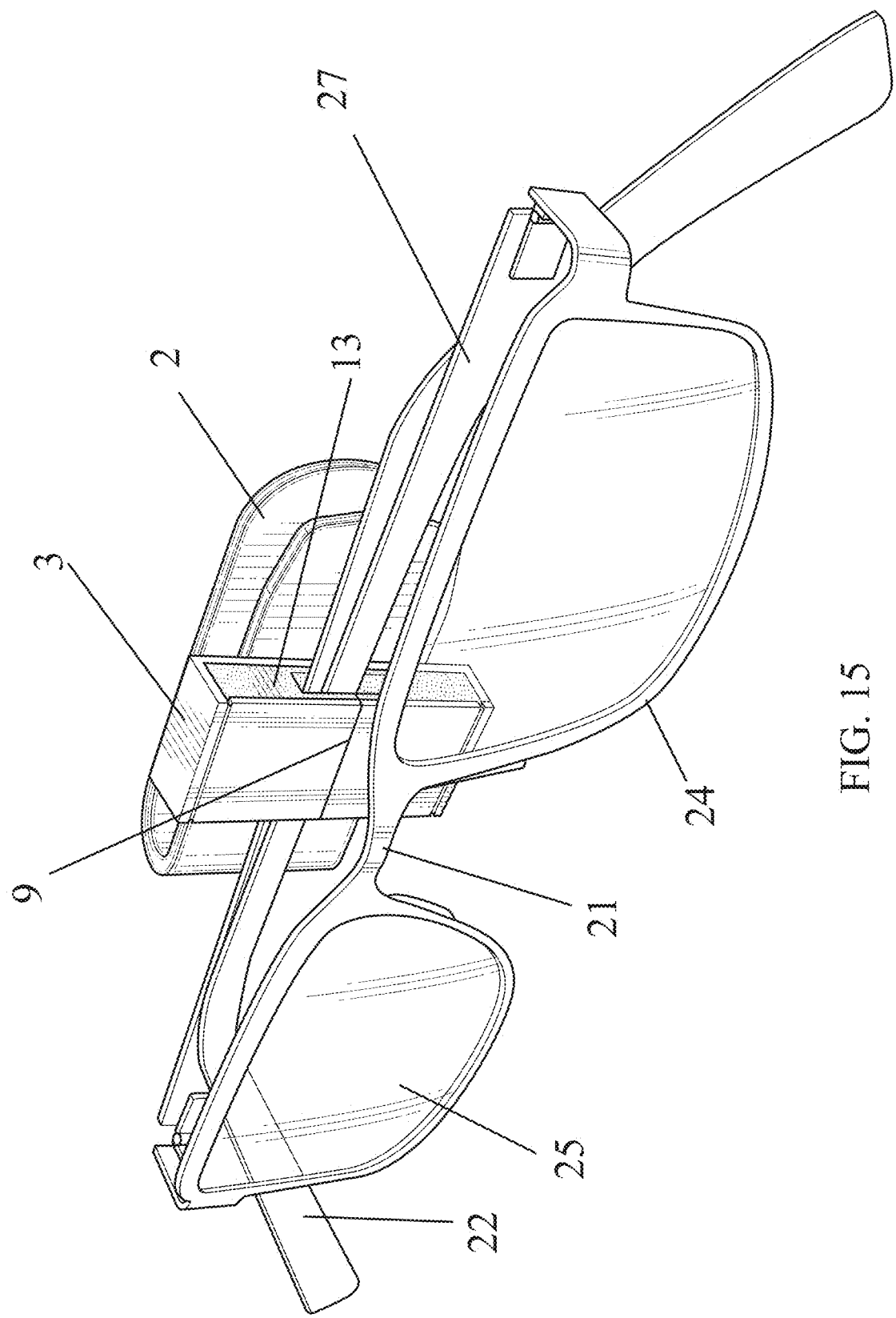
FIG. 15 shows a non-limiting example of a an eyeglasses container attached to a pair of eyeglasses according to some embodiments.
Figure 18:
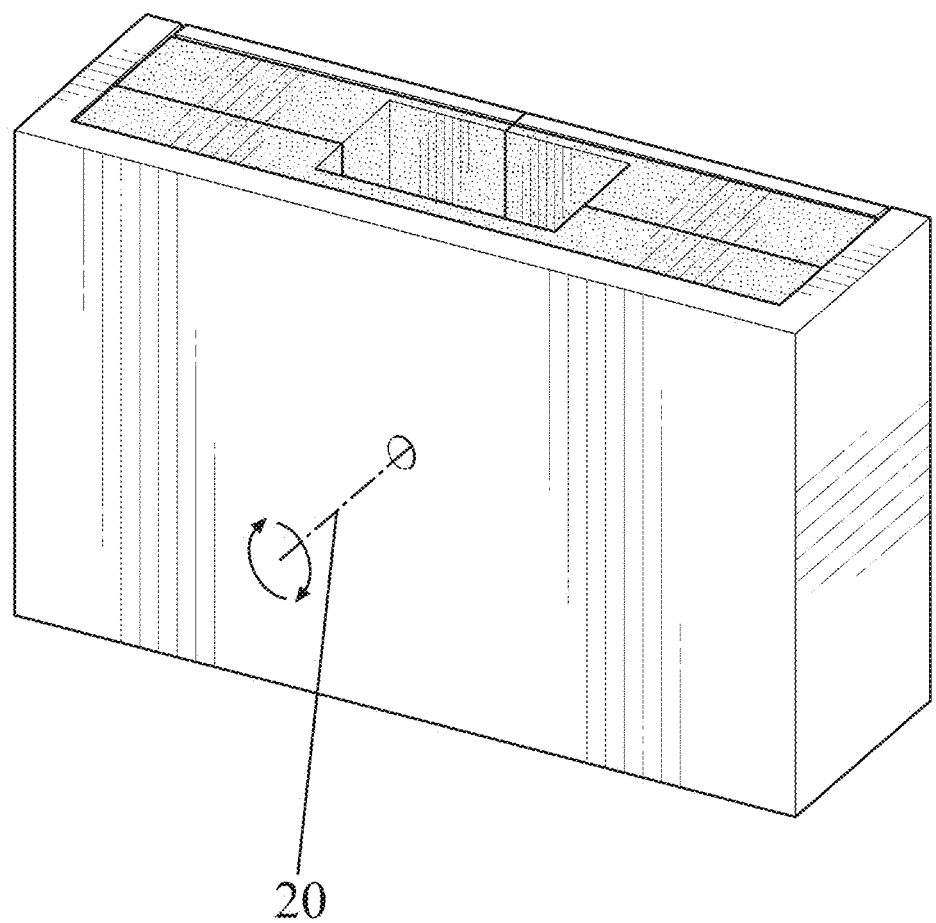
FIG. 18 shows a non-limiting example of a back side of an eyeglass holder according to some embodiments.

In some embodiments, an eyeglass holder may be rotatable (20) with respect to a fastener clip as shown in FIGS. 1, 15, and 18. FIG. 15 shows a non-limiting example of a pair of eyeglasses (27) which may include glasses, sunglasses, prescription glasses, readers, or the like held in an eyeglass holder compartment (3) after being pushed through moveable flaps. At least part of eyeglasses may be pushed though or even held in an eyeglass holder. The part of the eyeglasses may include but are not limited to a bridge (21), temple (22), temple tips, a frame (24), a lens (25) or the like.

In embodiments, the act of inserting or even removing eyeglasses from a holder, such as through moveable flaps, may be one handed or even one step of pushing or pulling a pair of eyeglasses with respect to the holder. Users can easily access their eyewear when needed, by merely pushing the arms of the glasses through dual direction flaps or even by pulling them outward to release. This easy access method may not require a clasp, magnet, spring, or the like to release and can be done without even looking down at the clip.

In embodiments, the design may be modified perhaps with a stick-on feature for attaching to a cell phone. Exact size, measurement, construction, and design specifications may vary upon further development and manufacturing.

As can be easily understood from the foregoing, the basic concepts of the various embodiments of the present invention(s) may be embodied in a variety of ways. It involves both eyeglass holder techniques as well as devices to accomplish the appropriate eyeglass holder. In this application, the eyeglass holder techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the various embodiments of the invention(s) and may not explicitly show how each feature or element can actually be representative of a broader function or of a great variety of alternative or equivalent elements. As one example, terms of degree, terms of approximation, and/or relative terms may be used. These may include terms such as the words: substantially, about, only, and the like. These words and types of words are to be understood in a dictionary sense as terms that encompass an ample or considerable amount, quantity, size, etc. as well as terms that encompass largely but not wholly that which is specified. Further, for this application if or when used, terms of degree, terms of approximation, and/or relative terms should be understood as also encompassing more precise and even quantitative values that include various levels of precision and the possibility of claims that address a number of quantitative options and alternatives. For example, to the extent ultimately used, the existence or non-existence of a substance or condition in a particular input, output, or at a particular stage can be specified as substantially only x or substantially free of x, as a value of about x, or such other similar language. In context, these should be understood by a person of ordinary skill as being disclosed and included whether in an absolute value sense or in valuing one set of or substance as compared to the value of a second set of or substance. Again, these are implicitly included in this disclosure and should (and, it is believed, would) be understood to a person of ordinary skill in this field. Where the application is described in device-oriented terminology, each element of the device implicitly performs a function. Apparatus claims may not only be included for the device described, but also method or process claims may be included to address the functions of the embodiments and that each element performs. Neither the description nor the terminology is intended to limit the scope of the claims that will be included in any subsequent patent application.

It should also be understood that a variety of changes may be made without departing from the essence of the various embodiments of the invention(s). Such changes are also implicitly included in the description. They still fall within the scope of the various embodiments of the invention(s). A broad disclosure encompassing the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of embodiments of the invention(s) both independently and as an overall system.

Further, each of the various elements of the embodiments of the invention(s) and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the various embodiments of the invention(s), the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which embodiments of the invention(s) is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "fastener" should be understood to encompass disclosure of the act of "fastening" —whether explicitly discussed or not—and, conversely, were there effectively disclosure of the act of "fastening", such a disclosure should be understood to encompass disclosure of a "fastener" and even a "means for fastening." Such changes and alternative terms are to be understood to be explicitly included in the description. Further, each such means (whether explicitly so described or not) should be understood as encompassing all elements that can perform the given function, and all descriptions of elements that perform a described function should be understood as a non-limiting example of means for performing that function. As other non-limiting examples, it should be understood that claim elements can also be expressed as any of: components, programming, subroutines, logic, or elements that are configured to, or configured and arranged to, provide or even achieve a particular result, use, purpose, situation, function, or operation, or as components that are capable of achieving a particular activity, result, use, purpose, situation, function, or operation. All should be understood as within the scope of this disclosure and written description.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the information disclosure statement filed with the application are hereby appended and hereby incorporated by reference, however, as to each of the above, to the extent that such information or statements incorporated by reference might be considered inconsistent with the patenting of the various embodiments of invention(s) such statements are expressly not to be considered as made by the applicant(s).

Thus, the applicant(s) should be understood to have support to claim and make claims to embodiments including at least: i) each of the eyeglass holder devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such processes, methods, systems or components, ix) each system, method, and element shown or described as now applied to any specific field or devices mentioned, x) methods and apparatuses substantially as described hereinbefore and with reference to any of the accompanying examples, xi) an apparatus for performing the methods described herein comprising means for performing the steps, xii) the various combinations and permutations of each of the elements disclosed, xiii) each potentially dependent claim or concept as a dependency on each and every one of the independent claims or concepts presented, and xiv) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in *Hakim v. Cannon Avent Group*, PLC, 479 F.3d 1313 (Fed. Cir 2007), or the like are expressly not intended in this or any subsequent related matter. In addition, support should be understood to exist to the degree required under new matter laws—including but not limited to European Patent Convention Article 123 (2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrases "comprising", "including", "containing", "characterized by" and "having" are used to maintain the "open-end" claims herein, according to traditional claim interpretation including that discussed in MPEP § 2111.03. Thus, unless the context requires otherwise, it should be understood that the terms "comprise" or variations such as "comprises" or "comprising", "include" or variations such as "includes" or "including", "contain" or variations such as "contains" and "containing", "characterized by" or variations such as "characterizing by", "have" or variations such as "has" or "having", are intended to imply the inclusion of a stated element or step or group of elements or steps but not the exclusion of any other element or step or group of elements or steps. Such terms should be interpreted in their most expansive form so as to afford the applicant the broadest coverage legally permissible. It should be understood that the term "a" used in the description and claims could mean "one" or could mean "at least one." Use of "at least one" in the description and claims is not intended nor used in this disclosure to mean that other claims or descriptions not incorporating the "at least one" language cannot further include one or more like elements and the language "at least one" is not intended nor used to change "open-ended" claims, inherently including devices or methods having additional elements or steps apart from those claimed, into "closed-ended" claims wherein devices or methods having additional elements would not be covered by such claims. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 9 or any other claim" or the like, it could be re-drafted as dependent on claim 1, claim 8, or even claim 11 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

With respect to the drawings, it should be understood that these present only initial views, mirror views such as left, right, top, bottom, front, and back should be understood as within the realm of this disclosure as may be appropriate for design or industrial design protections. Furthermore, any aspect and any portion of such drawings should be understood as potentially not within the scope of any then-made claim such as by then dashing any portion desired. And such drawings should be understood as including drawing elements such as rectangles, circles, ellipses, ovals, squares, and the like as particular side or other views as well understood from the existing drawings.

Also, with respect to design patent drawings, break in a line accompanied by a wavy line perpendicular to the broken line should be used to depict lines of varying length. The benefit of this is to claim the material regardless of varying length. Dashed lines can be used to disclaim parts of the design. Applicant reserves the right to claim any part, portion, element or combination thereof of the disclosed designs, including to replace any solid line with a broken line to disclaim any part, portion, element, or combination thereof of the disclosed design or to replace any broken line with a solid line to claim any part, portion, element, or combination thereof of the disclosed design. This specification includes an Appendix which forms part of the application disclosure and is incorporated herein by reference.

Finally, any claims set forth at any time are hereby incorporated by reference as part of this description of the various embodiments of the application, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

The invention claimed is:

1. An eyeglasses container comprising:
    a fastener clip; and
    an eyeglass holder compartment comprising:
        two movable flaps located side by side within a frame;
        an outermost edge of each of said moveable flaps are attached to said frame with a hinge mechanism;
        at least part of an innermost edge of each of said moveable flaps substantially meet together in a closed position;
        wherein each of said moveable flaps are configured to swing inward and outward along said hinge mechanism;
        a filling inside said frame configured to secure at least part of a pair of eyeglasses; and
        wherein said eyeglass holder is attached to said fastener clip.

2. The eyeglasses container of claim 1 wherein said moveable flaps are configured to swing inward when force is applied inward and wherein said moveable flaps are configured to swing outward when said force is applied outward.

3. The eyeglasses container of claim 1 wherein said moveable flaps are configured to be substantially flush in said closed position when no force is applied.

4. The eyeglasses container of claim 1 wherein said frame of said eyeglass holder comprises a shape chosen from rectangle, circle, and square.

5. The eyeglasses container of claim 1 wherein said frame of said eyeglass holder comprises a back side, a first side, and a second side; and wherein said outermost edge of each of said moveable flaps are attached to said first side and said second side.

6. The eyeglasses container of claim 1 wherein said eyeglass holder is rotatable with respect to said fastener clip.

7. The eyeglasses container of claim 1 and further comprising an opening in said filling.

8. The eyeglasses container of claim 1 wherein said filling comprises a substance chosen from silicon, soft silicone material with high elasticity, sponge, polyurethane foam, cellulose, polymers, foam rubber, cellulose sponge, melamine foam, foam sponge, loofah, hydrophilic foam, microfiber sponge, synthetic fibers, and absorbent material.

9. The eyeglasses container of claim 1 wherein said fastener clip is configured to be clipped to an object chosen from sun visor, clothing, handbag, belt, cell phone, cell phone case, computer, jewelry, and necklace.

10. A method for utilizing an eyeglasses container comprising steps of:
    providing an eyeglass holder compartment;
    pushing at least part of a pair of eyeglasses through two moveable flaps attached to a frame of said eyeglass holder compartment while said moveable flaps swing inward by a hinge mechanism between an outermost edge of each of said moveable flaps that are attached to said frame;
    pushing said at least part of said pair of eyeglasses into a filling inside said frame;
    securing said pair of eyeglasses into said filling;
    allowing said moveable flaps to move into a closed position where an innermost edge of each of said moveable flaps substantially meet together; and
    pulling said pair of eyeglasses from said filling and through said moveable flaps while said moveable flaps swing outward by said hinge mechanism.

11. The method of claim 10 and further comprising a step of attaching a fastener clip to said eyeglass holder compartment.

12. The method of claim 10 wherein said step of pushing at least part of a pair of eyeglasses through said moveable flaps comprises a step of one handed, one step pushing at least part of a pair of eyeglasses through said moveable flaps.

13. The method of claim 10 wherein said frame of said eyeglass holder comprises a shape chosen from rectangle, circle, and square.

14. The method of claim 10 wherein said frame of said eyeglass holder comprises a back side, a first side, and a second side; and wherein said outermost edge of each of said moveable flaps are attached to said first side and said second side.

15. The method of claim 10 wherein said step of allowing said moveable flaps to move into said closed position where an innermost edge of each of said moveable flaps to substantially meet together comprises a step of allowing said moveable flaps to be substantially flush in said closed position.

16. The method of claim 10 and further comprising steps of:
    providing an opening in said filling; and
    pushing said moveable flaps swing inward into said opening of said filling.

17. The method of claim 11 and further comprising a step of rotating said eyeglass holder with respect to said fastener clip.

18. The method of claim 10 wherein said step of pushing said at least part of said pair of eyeglasses through moveable flaps comprises a part chosen from bridge, temples, temple tips, frame, and lenses.

19. The method of claim 10 wherein said step of pushing said at least part of said pair of eyeglasses into said filling inside said frame comprise a filling chosen from silicon, soft silicone material with high elasticity, sponge, polyurethane foam, cellulose, polymers, foam rubber, cellulose sponge, melamine foam, foam sponge, loofah, hydrophilic foam, microfiber sponge, synthetic fibers, and absorbent material.

20. The method of claim 11 and further comprising a step of attaching said fastener clip to an object chosen from sun visor, clothing, handbag, belt, cell phone, cell phone case, computer, jewelry, and necklace.

* * * * *